United States Patent [19]

Wilson

[11] Patent Number: 5,717,376

[45] Date of Patent: Feb. 10, 1998

[54] SYSTEM FOR DETERMINING FAILURE OF REMOTE SENSING DEVICE

[75] Inventor: Mark M. Wilson, Center Line, Mich.

[73] Assignee: United Technologies Automotive, Inc., Dearborn, Mich.

[21] Appl. No.: 707,328

[22] Filed: Sep. 3, 1996

[51] Int. Cl.$^6$ ............................................. B60C 23/00
[52] U.S. Cl. ............................................. 340/442; 340/447
[58] Field of Search ............................. 340/442, 443, 340/444, 445, 446, 447, 448

[56] References Cited

U.S. PATENT DOCUMENTS

| | | | |
|---|---|---|---|
| 4,334,428 | 6/1982 | Fima et al. | 340/442 |
| 4,501,006 | 2/1985 | Korenberg | 377/45 |
| 5,170,343 | 12/1992 | Matsuda | 364/184 |
| 5,285,189 | 2/1994 | Nowicki et al. | 540/447 |
| 5,627,751 | 5/1997 | Davis et al. | 364/424.034 |

*Primary Examiner*—Thomas Mullen
*Assistant Examiner*—Nina Tong
*Attorney, Agent, or Firm*—Howard & Howard

[57] ABSTRACT

A system for detecting failure in one of a plurality of remote sensing devices utilizes a plurality of counters, each associated with one of the remote sensing devices. Each counter is initially loaded with an initial value. When a signal is received from a remote sensing device, its associated counter is reset to the initial value while the counters of the other remote sensing devices are stepped down. If a sensing device does not send a signal, its associated counter is stepped down numerous times, but never reset to the initial value. When a counter reaches a pre-determined value, typically zero, the associated sensing device is deemed to have failed.

20 Claims, 1 Drawing Sheet

SYSTEM FOR DETERMINING FAILURE OF REMOTE SENSING DEVICE

BACKGROUND OF INVENTION

The present invention relates generally to a system for detecting failure in remote sensing devices.

Currently, many vehicles include a plurality of remote sensing devices. One example is tire pressure sensors. A tire pressure sensor is generally mounted in each tire of a vehicle to send data indicating the current air pressure in the tire. The tire pressure sensor is totally self-contained and includes its own battery power source. Each of the tire pressure sensors sends an RF signal at generally regular intervals based upon an internal timing device, which can be a relatively low-frequency, low-power clock. The RF signals are sent to an RF receiver, which is often the same receiver utilized for a remote keyless entry device. Should the tire pressure sensor indicate low tire pressure (a flat tire), a warning signal will be sent to the driver. During normal operation of the vehicle, a control unit processes the data received from each of the tire pressure sensors and generates the appropriate warning signals. The control unit also utilizes its own internal clock to monitor whether it receives a signal from each of the tire pressure sensors within a predetermined time interval. If no signal is received from a tire pressure sensor within that predetermined time interval, the control unit determines that the tire pressure sensor has failed, and so indicates to the driver.

However, when the vehicle is parked and the engine is turned off, the control unit enters a "sleep" mode to conserve battery power. In the sleep mode, when one of the tire pressure sensors sends an RF signal, the control unit exits the sleep mode and processes the signal. Should a tire pressure sensor indicate low tire pressure during sleep mode, the control unit will indicate the condition to the driver when the engine is turned on. During the sleep mode, the clock for the control unit is disabled to conserve power. Therefore, the control unit cannot monitor whether a tire pressure sensor has generated a signal in a predetermined time period.

SUMMARY OF THE INVENTION

The present invention provides a system for determining that one remote sensor of a plurality of remote sensors has failed. Generally, the control unit relies upon the internal timing devices in the remote sensors to determine if one of the remote sensors has failed. Preferably, the control unit includes a counter associated with each remote tire pressure sensor in the system. Each counter is loaded with an initial value which is based upon the number of remote sensors and sets the number of transmissions that may be missed before it will be concluded that the remote sensor has failed. When a remote sensor signal is received, its associated counter is reset to the initial value and the counters corresponding to the other remote sensors are decremented. This process is repeated for each tire pressure sensor signal received. If all of the remote sensors are sending signals generally within the same time intervals (within some allowable margin which depends upon the initial value selected), none of the counters will reach zero.

If any of the counters is decremented to zero, the sensor corresponding to that counter is deemed to have failed. The system of the present invention does not require the control unit clock and is therefore operable during the sleep mode of the control unit. When the engine is restarted, the control unit exits sleep mode and reports the sensor failure to the driver.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
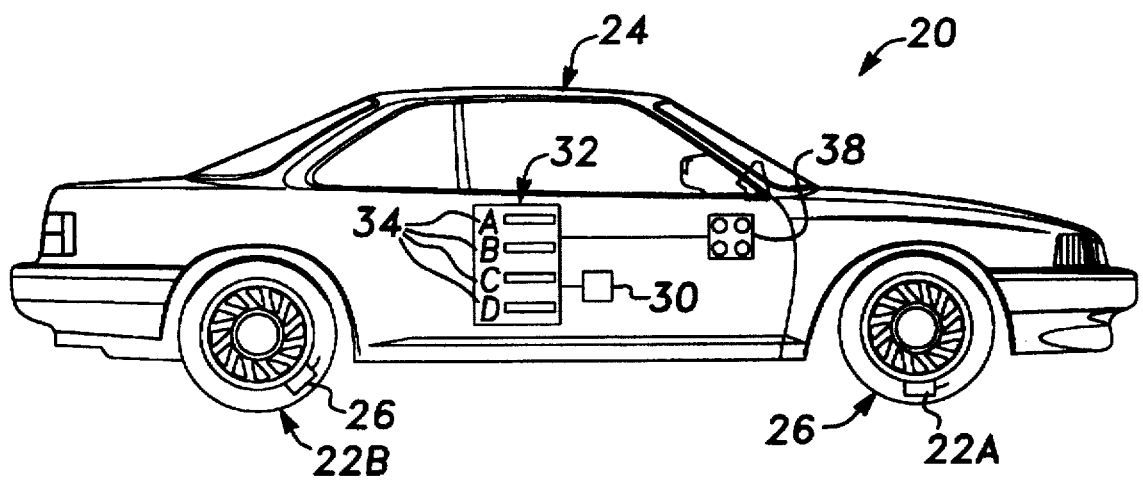
FIG. 1 is a schematic of the remote sensor failure detection system of the present invention.

The remote sensor failure detection system 20 of the present invention is shown schematically in FIG. 1. A plurality of remote sensors, such as tire pressure sensors 22 A-D, are mounted in a vehicle 24. Many remote tire pressure sensors are currently commercially available, including those manufactured by Schrader. Each of the tire pressure sensors 22 is mounted in a tire 26 of the vehicle 24 and periodically sends RF signals indicating the current tire pressure inside the tire 26 to an RF receiver 30. The RF receiver 30 can be the same RF receiver utilized for remote keyless entry systems currently available on many vehicles.

The tire pressure data is received by the RF receiver 30 and sent to a control unit 32 where the data is processed and analyzed. If the data indicates low tire pressure in any of the tires 26, a warning signal is sent to the driver. Each of the tire pressure sensors 22 sends signals at generally regular time intervals based upon a timing device in each sensor 22. Alternatively, some tire pressure sensors send signals at time intervals which depend upon the current speed of the vehicle 24.

Generally, the control unit 32 determines that a sensor 22 has failed if no signal is received within some general time interval. The control unit 32 determines that a sensor 22 has failed by monitoring the signals from the other sensors 22. For example, if a number of signals are received from sensors 22A-C without receiving a signal from sensor 22D, the control unit 32 determines that sensor 22D has failed.

Preferably, this is accomplished by providing the control unit 32 with a plurality of counters 36 A-D, each corresponding to a tire pressure sensor 22 A-D. Preferably, the counters 36 A-D are values stored in the software of the control unit 32; however, it should be apparent that hardware counters could alternatively be utilized.

At startup, each of the counters 36 is loaded with an initial value which is based upon the number of sensors 22 and which sets the number of transmissions that may be missed before a sensor will be determined to have failed. When a signal is received from a sensor 22, the control unit 32 resets the counter 36 associated with that sensor 22 to the initial value and decrements the counters 36 associated with the other sensors 22. This process is repeated for each signal received from the sensors 22. Generally, if the sensors 22 are sending signals within the same time interval (within some margin which is determined by the initial value), none of the counters 36 will reach zero.

If a sensor 22 fails, its associated counter 36 will be decremented each time a signal is received from the other sensors 22, but will never be reset to the initial value. When the counter 36 reaches zero, the associated sensor 22 is deemed to have failed and the control unit 32 indicates the condition to the driver on a display 38. The remote sensor failure detection system 20 is operable even when the control unit 32 is operating in sleep or low power mode, during which time its internal clock is inoperable. Although the specific disclosure here is that "zero" is required to trigger a failure, obviously some other number is within the scope of this invention.

Table 1 shows an example of a sequence of the values for the counters 36A–D. Each counter is initially loaded with an initial value, which for purposes of illustration here is six. When a signal is received from sensor 22A, its associated counter 36A is reset to six and the counters 36B–D corresponding to the other remote sensors 22A–D are decremented by a value, which in this example is one. This process is repeated for each tire pressure sensor signal received. In this example, sensor 22B does not send a signal during the time that six signals were received from the sensors 22A, 22C, 22D. When the counter 36B is equal to zero, the control unit 32 determines that sensor 22B has failed.

TABLE 1

| TIME | COUNTER A | COUNTER B | COUNTER C | COUNTER D |
| --- | --- | --- | --- | --- |
| initialization | 6 | 6 | 6 | 6 |
| sensor A is received | 6 | 5 | 5 | 5 |
| sensor C is received | 5 | 4 | 6 | 4 |
| sensor D is received | 4 | 3 | 5 | 6 |
| sensor A is received | 6 | 2 | 4 | 5 |
| sensor C is received | 5 | 1 | 6 | 4 |
| sensor D is received | 4 | 0 | 5 | 6 |

It should be apparent that the remote sensor failure detection system 20 of the present invention could be utilized for types of sensors other than tire pressure sensors 22. It should further be recognized that the counters 36 could be set to any initial value and stepped (incremented or decremented) by any value until reaching a predetermined value indicating a failure. The timing devices in the remote sensors 22 are utilized instead of the internal clock of the control unit 32. In effect, the timing devices of the remote sensors 22 are generally used to define a time interval during which a sensor 22 must send a signal or be deemed to have failed.

In accordance with the provisions of the patent statutes, the present invention has been described in what is considered to represent a preferred embodiment. However, it should be noted that the invention can be practices otherwise than as specifically illustrated and described without departing from its spirit or scope.

What is claimed is:

1. A system for determining the failure of a remote tire pressure sensor comprising:

a plurality of remote tire pressure sensors, each of said sensors disposed in a tire on a vehicle and sending signals relating to the pressure in said tire at generally regular time intervals;

a control unit receiving signals from said sensors; and a system for determining that a failed one of said sensors has failed based upon said control unit receiving a predetermined number of signals from said sensors without receiving a signal from said failed one of said plurality of sensors.

2. The system for determining the failure of a remote tire pressure sensor according to claim 1 wherein said signals from said plurality of sensors are counted, said system determining that said failed sensor has failed based upon said counted signals reaching said predetermined number without receiving a signal from said failed sensor.

3. The system for determining the failure of a remote tire pressure sensor according to claim 1 further including:

a plurality of counters, each counter being associated with one of said sensors, said each counter resetting to an initial value upon said control unit receiving data from said associated sensor, and said plurality of counters other than said associated counter being stepped by a predetermined value; and an indicator for indicating when at least one of said counters reaches a predetermined value.

4. The system for determining the failure of a remote tire pressure sensor according to claim 1 wherein said control unit includes a clock and a sleep mode, said clock being inoperable during said sleep mode, said control unit exiting said sleep mode upon receiving a signal from one of said plurality of sensors.

5. The system for determining the failure of a remote tire pressure sensor according to claim 1 further including a counter associated with one of said plurality of sensors, said counter being reset based upon a signal being received from said associated sensor and being stepped based upon a signal being received from any of said plurality of sensors other than said associated sensor, said system determining that said associated sensor has failed based upon said counter stepping said predetermined number of times without being reset.

6. The system for determining the failure of a remote tire pressure sensor according to claim 5 wherein said predetermined number is at least equal to the number of said plurality of sensors.

7. The system for determining the failure of a remote tire pressure sensor according to claim 1 wherein said system determines that said failed one of said plurality of sensors has failed based upon said control unit receiving said predetermined number of signals from sensors other than said failed sensor without receiving a signal from said failed sensor, said predetermined number being at least equal to the number of said plurality of sensors.

8. A system for determining the failure of a sensor comprising:

a plurality of sensors, each sensor sending signals at generally regular time intervals;

a control unit receiving signals from said each sensor; and a system for determining that a failed one of said plurality of sensors has failed based upon said control unit receiving a predetermined number of signals from sensors other than said failed sensor without receiving a signal from said failed sensor.

9. The system for determining the failure of a sensor according to claim 8 further including:

at least one counter being stepped when said control unit receives a signal from one of said plurality of sensors; and an indicator generating a warning when said at least one counter reaches a predetermined value without receiving a signal from one of said plurality of sensors.

10. The system for determining the failure of a sensor according to claim 8 further including:

a plurality of counters, each counter being associated with one of said plurality of sensors said each counter resetting to an initial value upon said control unit receiving data from said associated sensor, said plurality of counters other than said associated counter being stepped by a predetermined value upon said control unit receiving data from said associated sensor; and an indicator for indicating when at least one of said counters reaches a predetermined value.

11. The system for determining the failure of a sensor according to claim 8 wherein said sensors are remote tire pressure sensors.

12. The system for determining the failure of a sensor according to claim 8 wherein said each sensor includes an internal, independent timing device.

13. The method for determining the failure of a sensor of claim 8 wherein said predetermined number is at least equal to the number of said plurality of sensors.

14. A method for determining the failure of a sensor comprising the steps of:

receiving signals from a plurality of sensors, said sensors sending said signals at generally regular independent time intervals;

counting the number of said signals received from said plurality of sensors other than a failed one of said plurality of sensors without receiving a signal from said failed sensor;

comparing the counted number to a predetermined number; and generating a warning based upon said comparison of said counted number to said predetermined number.

15. The method for determining the failure of a sensor according to claim 14 further comprising the steps of:

a) associating a counter with each of said plurality of sensors including a first counter associated with a first sensor each counter being set to an initial value;

b) receiving data from said first sensor;

c) resetting said first counter to said initial value upon receiving data from said first sensor;

d) stepping a plurality of counters other than said first counter; and e) generating said warning when at least one of said counters reaches a predetermined value.

16. The method for determining the failure of a sensor of claim 15 wherein said counters other than said first counter are decremented in step d).

17. The method for determining the failure of a sensor of claim 15 wherein said warning is generated in step e) when at least one of said counters equals zero.

18. The method for determining the failure of a sensor of claim 15 further including the step of initializing all of said plurality of sensors to said initial value.

19. The method for determining the failure of a sensor of claim 15 wherein said sensors include internal, independent timing devices.

20. The method for determining the failure of a sensor of claim 14 wherein said predetermined number is at least equal to the number of said plurality of sensors.

* * * * *